May 19, 1970
H. W. TITHERINGTON
3,513,465
SOUND MONITORING SYSTEM HAVING PLURAL SELECTIVELY
DISCONNECTABLE MICROPHONES AND A CENTRAL
MONITORING STATION
Filed Aug. 24, 1966
2 Sheets-Sheet 1
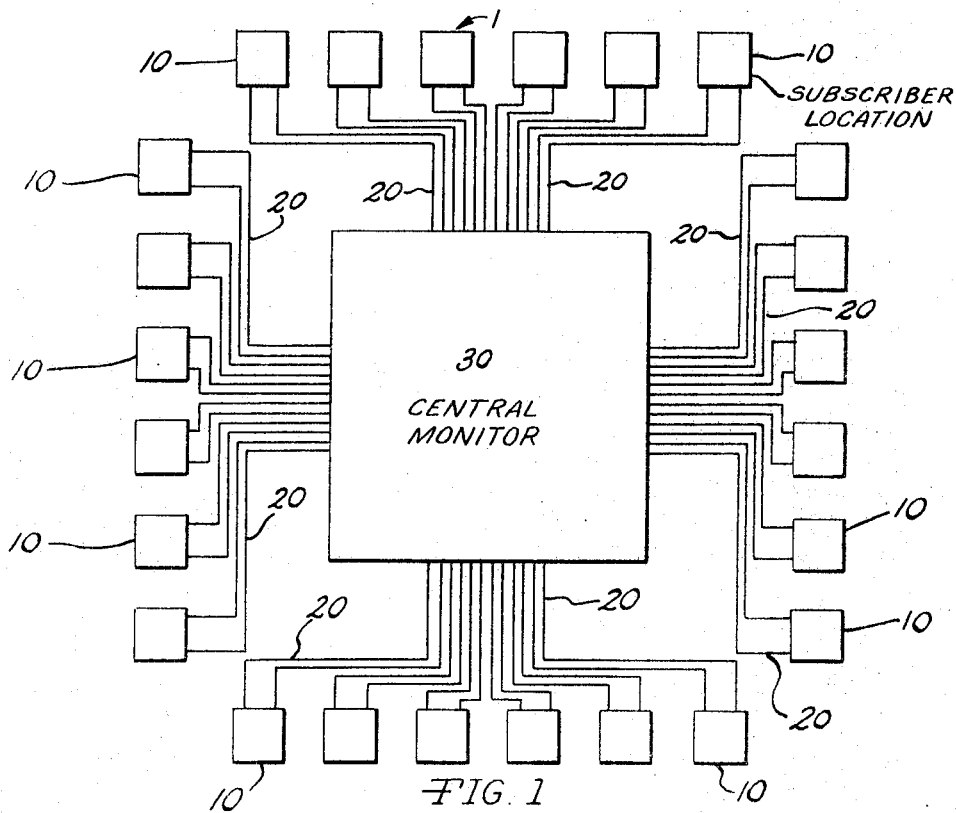
FIG. 1
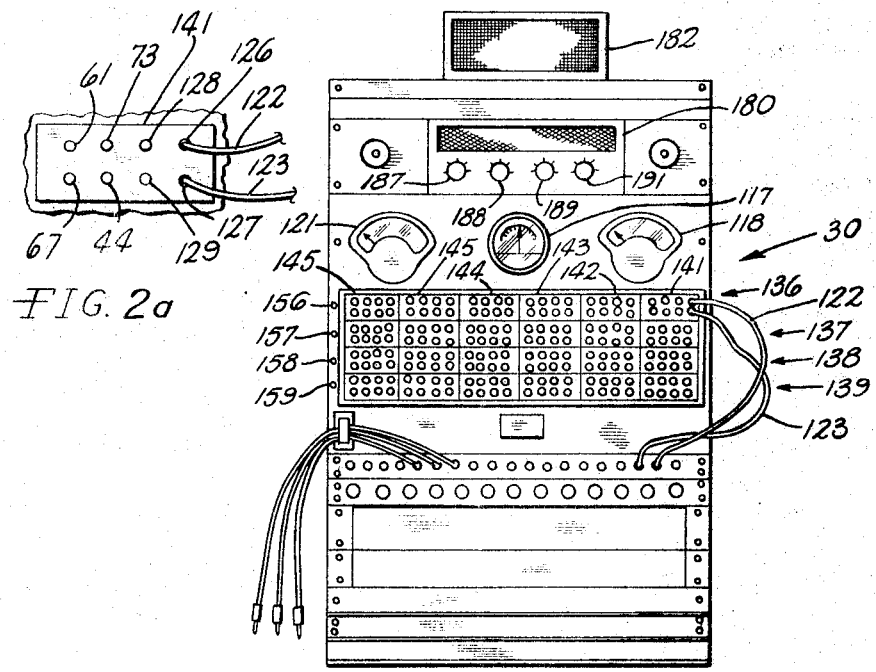
FIG. 2a
FIG. 2
INVENTOR
HENRY W. TITHERINGTON
BY Roy A. Plant
ATTORNEY

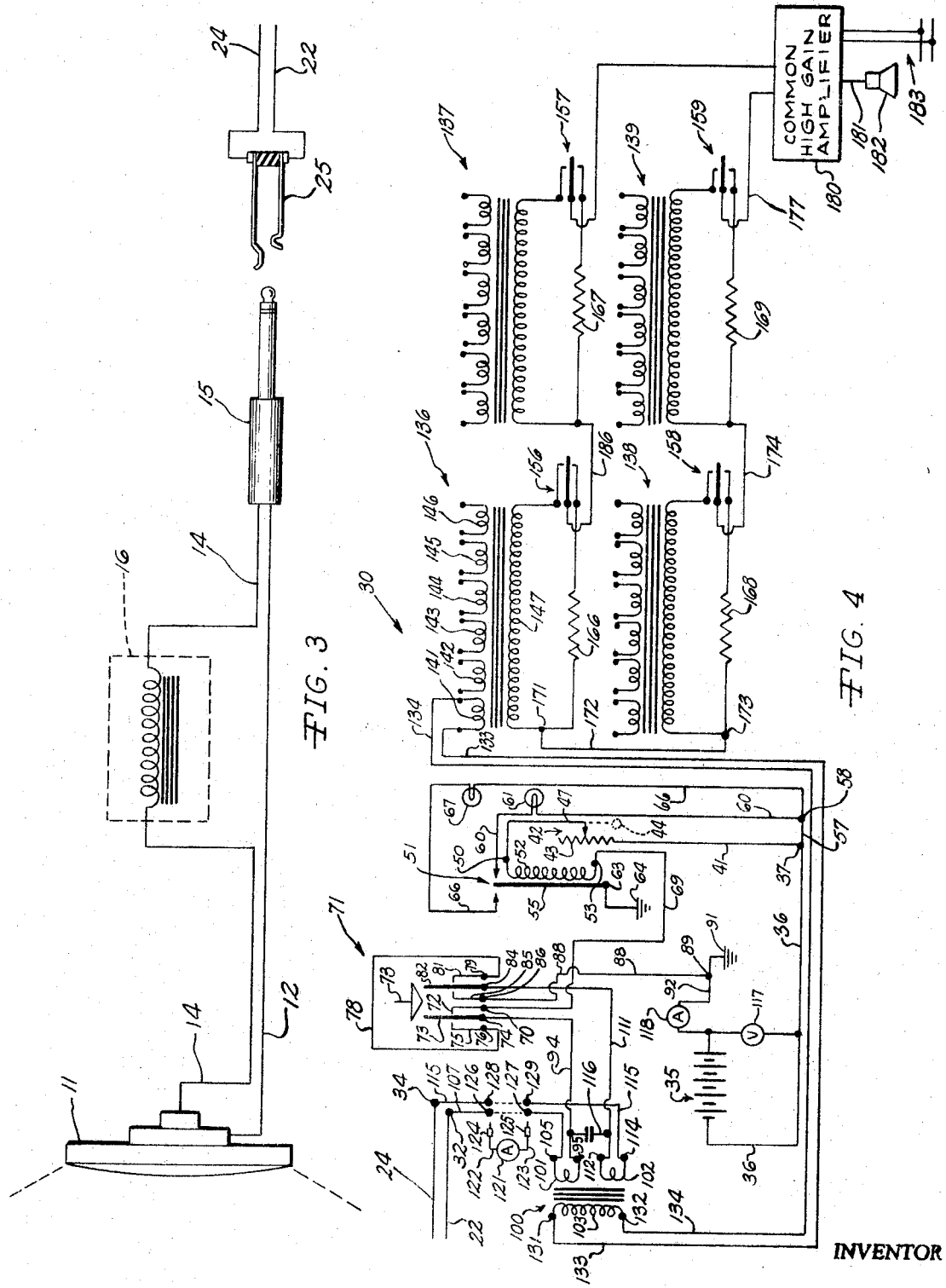

United States Patent Office 3,513,465
Patented May 19, 1970

3,513,465
SOUND MONITORING SYSTEM HAVING PLURAL SELECTIVELY DISCONNECTABLE MICROPHONES AND A CENTRAL MONITORING STATION
Henry W. Titherington, 353 W. Territorial Road, Battle Creek, Mich. 49015
Filed Aug. 24, 1966, Ser. No. 574,649
Int. Cl. G08b 13/16
U.S. Cl. 340—261  8 Claims

ABSTRACT OF THE DISCLOSURE

An audio warning system having a microphone at each of a plurality of different subscriber stations, a transmission channel connecting the microphones at the different subscriber locations to a central monitoring location, circuitry at the monitoring location connecting all of the different microphones to a common amplifier having a common loudspeaker connected to its output, such that each of the different subscriber locations may continually be audibly monitored at the same time from the central location for the occurrence of any unusual sound at any subscriber location, together with switching means at the central location for selectably disconnecting any of the subscriber locations, to provide isolation at a particular such location of any unusual sound heard while monitoring all locations.

---

This invention relates broadly to a warning system and more specifically to an audio protection system to deliver early warning signals for both human and natural dangers to property and equipment.

Industrial and commercial businesses and private and public associations have continual demands placed upon them to provide proper protection for themselves and their property and equipment from natural, mechanical and human sources of injury and loss. Many of these institutions are unable to get proper insurance protection for their facilities because of past loss experience. Both large and small businesses and associations are affected by this situation. Many large businesses and associations have small facilities spread over many state and geographical locations providing manufacturing facilities closer to market areas. Many large corporations and associations have small facilities spread out over large areas on what would be classified as the same land site. Smaller businesses and associations have the disadvantage in many cases of having one point or location of operation. Thus, if the revenue generating capacity of their one facility is shut down, no revenue can be produced by this group.

As mentioned above, many of these businesses and associations are not able to acquire insurance or the insurance rates are very high. If equipment is destroyed or prevented from operating for even a short period of time regardless of the insurance coverage, many businesses and associations would be shut down completely. Because of this critical production problem for many businesses and associations, there is a great need to take all necessary steps to see that revenue generating facilities are constantly operating at full capacity. Even with companies and institutions which provide patrol services, it is economically impossible to provide 100% protection facilities in all areas at all times.

Some institutions, for example, school facilities are spread out over large areas in a single community and have frequently been jeopardized by vandals entering their facilities and wantonly destroying property which must be replaced at very expensive costs. There are other facilities, such as hunting lodges, summer cottages, model display houses, recreational resorts, et cetera, that may be shut down for periods of time and would only need a protective system for these extended periods of time when the facilities are not operating. Individuals who leave their homes for a vacation and take up temporary residence for a month or two outside their own community have not been able to develop an adequate protection program for their benefit.

It was a recognition of these problems and difficulties and the need for an efficient protective warning system to handle these various applications with a uniform approach which led to the conception and development of the present invention.

The present invention has particular benefit to the business and industrial people because it can spot both vandalism and burglaries along with natural disasters such as fires, and also it can pinpoint mechanical problems such as defective boilers, damaged water pipes, et cetera. This type of system would have great benefit to school districts where the present facilities are so costly that schools have not been able to install them to protect their property. Normally, damage in the school system is caused by young juvenile vandals and if their entry into the building was picked up immediately at a central point, literally tens of thousands of dollars could be saved annually in all large cities throughout the country that are presently uninsured, and commercially available warning systems have not been able to eliminate this great source of loss. The school facilities and other subscriber locations may wish to have several microphones connected throughout one building or location and pass through one subscriber circuit which would be permissible and in conformity with the principles of the present invention. It would just reduce the pinpointing of the problem area to the exact location which may not be necessary in all applications.

Accordingly, among the objects of the present invention is the provision of a protective system which can give immediate warning of various natural, mechanical and human situations at specific locations.

Another object of the present invention is to provide a protective warning system using electronic means which can be easily concealed from view.

Another object of the present invention is to provide a protective warning system which can reduce or substantially eliminate false alarms being given.

A further object of the present invention is to provide a protective warning system which can be connected and disconnected by a simple operation and can provide a central monitoring arrangement where the troubled location can be substantially ascertained on a moment's notice.

A still further object of the present invention is to provide a fool-proof protective warning system which will greatly reduce crime, making undetected entry virtually impossible.

Still further objects and advantages of the invention will appear as the description proceeds.

To the accomplishment of the foregoing and related ends, the invention, then, consists of microphones at various subscribers' locations tied into a central monitoring device through service lines, with a quick check unit on the monitoring device hereinafter fully described and particularly pointed out in the claims, the annexed drawings, and the following description setting forth in detail certain means for carrying out the invention, such disclosed means illustrating, however, but one of the various ways in which the principle of the invention may be used.

In the annexed drawings:

FIG. 1 is a schematic view showing the basic principles of the present invention and the broad relationship of the relative elements of the warning alarm system.

FIG. 2 is a front elevational view of the central monitoring unit cabinet member of the present invention.

FIG. 2a is an enlarged view of a subscriber plate on the central monitoring unit cabinet member of FIG. 2.

FIG. 3 is a schematic view of the electrical equipment provided at the subscriber's premises as illustrated in FIG. 1 and having the basic principles of the present invention.

FIG. 4 is a schematic view of the electrical circuitry provided within the central monitoring unit cabinet member illustrated in FIG. 2 and having the basic principles of the present invention.

The present invention covers a warning alarm system to be utilized for eliminating or reducing to a minimum loss to individual people and groups owning, operating, and controlling various plants, buildings and facilities. The warning alarm system covered by the present invention operates by having a microphone located at the location to be protected and being connected to a central monitor unit by some type or form of channel service between the two units. The central monitor unit will provide a common loudspeaker for a number of microphones at the various locations being protected. This will permit one man, acting as an observer, to listen to a group of facilities protected by this warning alarm system. A switching arrangement will be provided so the observer can determine in a matter of seconds the exact subscriber location in jeopardy and the nature of the jeopardy. The central monitoring unit will be so provided that each microphone will pass through and be controlled by an individual circuit which will automatically and immediately indicate an open circuit and can detect changes made to the subscriber's circuit by periodic testing. The facilities such as stores, factories, warehouses, offices, individual homes, clubhouses, gasoline stations, schools, churches, et cetera, have been found to be very desirable recipients of this type of warning protection service. This warning service gives substantially immediate warning of fire, water, defective equipment such as boilers, immediate notice of vandalism, breaking and entering, and many other possible hazards. The mere presence of this warning alarm system has great benefit in keeping track of persons coming into the premises at odd hours. Realizing that this equipment has been installed, employees must give notice that they will be coming back to the protected facility for late deliveries, pick-ups, et cetera, and will substantially eliminate or reduce employee pilfering during these occasions.

Referring to the drawings, we have a warning system generally indicated as 1 in FIG. 1. This warning system 1 includes a series of subscriber premises, indicated generally as 10 and connected with a channel service indicated generally as 20. The channel service 20 connects the subscriber premises 10 with a central monitor unit indicated generally as 30. The full function and interaction between these elements will be discussed in more detail below.

A varying number of subscriber premises 10 could be connected in with the central monitor unit 30. However, for the present illustration twenty-four subscriber premises have been illustrated.

A very limited amount of equipment is necessary at the subscriber premises 10. The equipment which is necessary at the subscriber premises is illustrated in FIG. 3. This includes a microphone 11 which is connected to lines 12 and 14. Lines 12 and 14 pass into a connecting jack 15, and an impedance correcting device 16 is provided along line 14. Channel service 20 is connected with the subscriber premises equipment 10 by two lines 22 and 24. At the end of channel service 20 associated with subscriber premises 10, the lines 22 and 24 join into a receiving jack 25. The connecting jack 15 positions microphone 11 in electrical contact with central monitor unit 30 through receiving jack 25 and lines 22 and 24 of channel service 20.

Referring generally to FIG. 4, lines 22 and 24 of channel service 20 connect to the central monitor unit 30 at posts 32 and 34. The warning system 1 is provided with DC electric power from batteries 35 located in central monitor unit 30. Line 36 is secured to batteries 35 and connects them with post 37. Post 37 is connected to line 41 which is connected to amperage setting device 42. The amperage setting device 42 has a resistance member 43 and a milliamp setting knob 44. The amperage setting device 42 is connected to line 47. The line 47 makes adjustable contact with resistance member 43. The milliamp setting knob 44 can be turned to adjustably position line 47 in contact along the length of resistance member 43 as desired, the full purpose and function of which will be explained in more detail below. Line 47 contacts post 50 which is connected to closed circuit relay 51. Closed circuit relay 51 is connected to post 50 by coil 52. The coil 52 connects the closed circuit relay 51 to post 53. A contact arm 55 is provided in closed circuit relay 51 and is actuated by coil 52, the full purpose of which will be discussed in more detail below.

Post 37 also passes current through line 57 to post 58. During normal operation post 58 passes electrical current through line 60. Line 60 has a lamp member 61 and normally makes contact with contact arm 55. When contact is provided between line 60 and contact arm 55 the current passing through lamp member 61 passes through post 63, to ground 64 completing a circuit. At this particular instance, when lamp member 61 is lit it indicates that there is a closed subscriber circuit. As long as current is passing through coil 52 contact arm 55 will be held in contact with line 60. Post 58 is also connected to line 66. Line 66 terminates adjacent contact arm 55 and is provided with a lamp member 67. If for any reason the subscriber current does not flow through coil 52, the contact arm 55 will move out of contact with line 60 and come into contact with line 66, thus turning off lamp member 61 and turning on lamp member 67. In one application one combination would be to have lamp member 61 colored green indicating a closed circuit and have lamp member 67 colored red indicating an open circuit. When the subscriber circuit is functioning properly the green lamp member 61 would be lit but if the circuit was opened for any reason the red lamp 67 would immediately go on. Lamp member 67 could be an audible alarm as well as a light in another embodiment, not shown in the drawings but which is well known in the art.

Post 53 is connected to line 69 which passes up to post 70. Post 70 will pass electrical current into check switch 71. Post 70 is connected to lead 72. Lead 72 is normally in contact with an arm 73 which is connected to a post 74. On the opposite side of arm 73 is lead 75 which contacts post 76. Line 78 connects post 76 and a post 79. Post 79 connects to a lead 81. Lead 81 is normally out of contact with an arm 82. Arm 82 is mounted on a post 84 and is normally in contact with a lead 85. Lead 85 is connected to a post 86. Post 86 is connected to line 88 which connects it to a post 89. The post 89 is connected to ground 91 and line 92. Line 92 is connected to batteries 35 on the opposite side from line 36 as illustrated in FIG. 4. A line 94 is connected with post 74 at one end and is connected to a post 95 at its other end. Post 95 connects the electrical circuit to a line coil device 100. The line coil device 100 has coils 101, 102 and 103. The post 95 is connected to the other side of coil 101. Post 105 is connected to the other side of coil 101. Post 105 is connected to line 107 which contacts post 32. The central monitor unit 30 is then connected to the equipment at the subscriber premises 10 through line 22 which also connects to post 32.

Post 84 of check switch 71 is connected to one end of a line 111. The other end of the line 111 is connected to post 112 which in turn is connected to one side of coil 102. The other side of coil 102 is connected to post 114 which is connected to one end of a line 115. Line 115 is connected at its other end to post 34. A transmission improving condenser 116 is connected across lines 94 and 111 adjacent to coil line device 100.

A voltmeter 117 is connected across lines 92 and 36 to show the voltage of the batteries 35. An ammeter 118 is connected along line 92 to show the amperage of the total central monitor unit 30. A subscriber ammeter 121 is connected with one end of lines 122 and 123. Lines 122 and 123 have jacks 124 and 125 positioned at their other ends, respectively. The jacks 124 and 125 can be plugged into sockets 126 and 127 which are connected to line 107. The jacks 124 and 125 can also be plugged into sockets 128 and 129 which are connected to line 115. When the jacks 124 and 125 are plugged in the lines 107 or 115 that line is automatically broken to pass through the ammeter 121. The subscriber ammeter 121 will read the amperage in the individual subscriber circuit being checked. This function will be discussed in more detail below.

The batteries 35 will provide the electrical power for all the individual subscriber circuits. However, each subscriber circuit will be independent in all other ways. The batteries 35 are connected to line 36. Line 36 will carry current to post 37 through line 41 onto resistance member 43. The current will continue through line 47 on through closed circuit relay 51, via coil 52, on through line 69 to post 70, then on through lead 72 through arm 73 to post 74. The current will continue through line 94 to post 95 on through coil 101 and post 105 then through post 32 on through line 22 passing through receiving jack 25 into connecting jack 15 on through line 12. Then the current will pass through microphone 11 on through line 14, including the impedance correcting device 16 and on through connecting jack 15 and receiving jack 25. It will then continue through line 24 back to post 34 on down through line 115 to post 114. The current then passes through coil 102 in post 112, then through line 111 up to post 84 and up arm 82 then into lead 85 to post 86. The current then continues through line 88, post 89 back through line 92 to batteries 35.

When the subscriber circuit is first initiated the milliamp setting knob 44 will be turned so that the ammeter 121 will have a milliamp reading normally substantially within the range of 25 to 45 milliamp. Once the amperage rate is established, it will remain the same unless there is some alteration in the individual subscriber circuit. If lines 12 and 14 or lines 22 and 24 are broken, the subscriber circuit will become an open circuit. At this time the electric current will stop flowing through coil 52 and the contact arm 55 will move out of contact with line 60 and into contact with line 66, thus the green lamp member 61 indicating a normal closed circuit will terminate and make contact with line 66 to illuminate lamp member 67 which could be red to indicate immediate danger on that circuit. Also, in some embodiments an audio sound may be produced. The ammeter 121 can be used with either sockets 126 and 127 or 128 and 129 to provide information of the amperage in this individual circuit by use of lines 107 or 115, respectively. If any electrical equipment has been added to the individual subscriber circuit it will alter the milliamp setting which was established with the original setting of the amperage by the adjustment of milliamp setting knob 44. In the present illustration there is shown a means, ammeter 121 and its associated equipment, which can be used to check the amperage in any of the individual subscriber circuits. This checking operation can be made at various irregular times of night or day or on a scheduled basis. If there is any additional equipment added to or taken away from the subscriber circuit this adjustment will be thrown off and the ammeter 121 will disclose this immediately upon running a check and an inquiry can be made as to the exact cause.

Line coil device 100 permits only AC current to pass through coil 103. The sides of coil 103 are connected to posts 131 and 132. Posts 131 and 132 are connected to lines 133 and 134, respectively, and these are connected to impedance matching transformer 136. Impedance matching transformers 137, 138, and 139 are also provided. Their purpose and function will be discussed below. Impedance matching transformer 136 has six low impedance windings 141, 142, 143, 144, 145 and 146 and a common high impedance winding 147. The impedance matching transformers 136, 137, 138 and 139 are used together to provide a proper impedance matching. Parallel and series winding is necessary. A disconnect switch 156 is connected to one side of common high impedance winding 147 of the impedance matching transformer 136. The disconnect switch 156 can remove the common high impedance winding 147 from the circuit, thus eliminating any effect of the input from low impedance windings 141, 142, 143, 144, 145 and 146 to the amplifier, which will be discussed in detail below. When the disconnect switch 156 is switched from its normal position, as illustrated in FIG. 4, it causes the electric current to pass through maintaining resistor 166 so that the overall level of the system is still maintained. Maintaining resistors 167, 168 and 169 are provided in impedance matching transformers 137, 138 and 139, respectively, and perform the same function of maintaining the overall level of the system in their transformer. The electric current will pass into low impedance winding 141 when disconnect switch 156 is in its normal position and then on through high impedance winding 147 to post 171 and on through line 172 to post 173. The current then passes on through impedance matching transformer 138 and out through disconnect switch 158 through line 174, on through impedance matching transformer 139 out through disconnect switch 159 through line 177 into a common high gain amplifier 180. The common high gain amplifier 180 then puts this electrical signal into an audible signal and sends it through a line 181 to a common loudspeaker 182. The electric current will leave common high gain amplifier 180 through line 185 and pass into disconnect switch 157 and on through impedance matching transformer 137 to continue completing the electrical circuit. The electric current leaves transformer 137 via a line 186 and passes into disconnect switch 156 and on through high impedance matching transformer 156. This completes the circuit. AC power supply 183 provides alternating current to common high gain amplifier 180.

If the user of the warning system 1 wished to disconnect impedance matching transformer 136 so that it would not transmit sound coming from the microphones 11 connected to low impedance windings 141, 142, 143, 144, 145 and 146, the disconnect switch 156 would be switched from its normal position, thus passing the current through maintaining resistor 166. Each of the four transformers 136, 137, 138 and 139 can be disconnected by their disconnect switches 156, 157, 158, and 159, the full purpose and function of which will be explained in more detail below.

Referring generally to FIG. 2a, lines 122 and 123 of the subscriber circuit are plugged into sockets 126 and 127 thus checking the subscriber circuit amperage along line 107. Low impedance winding 141 is indicated as the whole face plate in this drawing. All the low impedance windings of the impedance matching transformers are represented along the top row of the central monitoring unit 30 as illustrated in FIG. 2. Each face plate has eight attachments as visible in FIG. 2a. In addition to sockets 126 and 127 we have sockets 128 and 129 for use in conjunction with checking the amperage at Line 115. Also lamp members 61 and 67 are placed on the face plate to indicate whether the circuit is closed or open as explained above in detail. The check button 73 of check switch 71 is also provided on the face plate and when it is activated to open the subscriber circuits the closed circuit lamp 61 will be turned off and open circuit lamp member 67 will then come on. In the present illustration milliamp setting knob 44 is positioned below the check button 73 of check switch 71 and may be turned to adjust the proper milliamp for the subscriber circuit as ex-explained above in reference to FIG. 4. The set-up for the face plate could be arranged in various manners; however, this is an illustration of one workable embodiment.

Referring to FIG. 2, common high gain amplifier has a treble control knob 187, a base control knob 188, and a volume control knob 189. A selector knob 191 is also provided. The selector knob 191 could have various benefits such as it could be constructed to automatically provide for a tape recorder to be turned on as soon as unusual noises have been picked up at a subscriber location by turning the selector knob 191 to a proper station.

To operate the warning system 1 the subscriber premises 10 will have microphones 11 installed as discussed above. The microphone 11 will be connected to the central monitor unit 30 by channel service 20. This channel service 20 can include lines laid directly between the subscriber premises and the central monitor unit 30 or in many cases, they would be audio channels leased from a telephone company, thus permitting nominal monthly rental for this service line and also very fast and inexpensive connections and disconnections to and from various subscriber locations. The channel service 20 will then be connected into the central monitor unit 30 completing the individual subscriber circuits. All the microphones 11 will pass through the common high gain amplifier 180 which, in turn, passes the audio signal onto the loudspeaker 182. The sound quality can be controlled in a manner well known in the art by treble control knob 187 and base control knob 188 and volume control knob 189. As each subscriber circuit is connected up the person monitoring the loudspeaker 182 can adjust the amperage through milliamp setting knob 44 as discussed above, giving the proper milliamp reading on subscriber ammeter 121 when plugged into any of the individual subscriber circuits.

All units that are being operated will have the lamp member 61 lit indicating a closed circuit. If there is any noise, for example, a fire at any of the subscriber premises, the noise of the fire, the crackling, et cetera, will be produced through the loudspeaker 182. At this time the operator can immediately move all the disconnect switches 156, 157, 158 and 159 to electrically disengage the common high impedance windings and engage the maintaining resistors. Then the operator can proceed with reconnecting one disconnect switch a at time until the impedance matching transformer which is receiving the sound from a subscriber location is indicated. At this time the operator can then push the check switches of the individual subscriber circuits opening those circuits until the sound producing subscriber circuit is determined. At this time the operator can push the check switch 71 opening the circuits of the low impedance windings individually on that impedance matching transformer. For example, if it was determined that the noise was coming from a subscriber circuit connected to impedance matching transformer 136, the operator could proceed down the line opening the individual subscriber circuits connected to low impedance windings 141, 142, 143, 144, 145 and 146 by activating their check switches 71 until the noise terminates. Thus, when the sound stops he would know that that is the station where the activity was occurring. He then opens all other subscriber circuits by pushing their check switches and continues listening to the one having the disturbance. At the same time the observer contacts the local fire department or whatever steps the management of that business had directed him to take.

While checking out the central monitor unit 30 periodically, the operator could check each individual subscriber circuit through the subscriber ammeter 121 to make sure that the amperage in the circuit had not changed, as discussed above. In some applications, instead of having lamp member 67 as a light, an indicator means might deliver an audio sound or the indicator means might deliver an audio sound and a light signal, as discussed above, so that immediately upon the opening of any subscriber circuit for any reason the operator would be aware of the opening and could act immediately to determine which circuit had been changed. Another check for the present central monitor unit 30 would be to have a loudspeaker adjacent the area that the microphones 11 have been positioned at. Thus, the operator periodically could activate the loudspeaker and determine whether the sound was coming back through the individual microphones 11. This would assure that the microphone 11 was functioning properly and had not been covered up and cut off from receiving sounds in its area.

Some operators of businesses, for example, grocery stores and beer take-out stores, may wish to have dog protection in the store. Immediately upon the entrance into the building of unauthorized personnel, the dog would start barking and this would be readily picked up by the microphone 11 and transmitted to the loudspeaker to indicate the trouble present at the facility to the operator doing the monitoring.

Many other indicator means can be electrically tied in to the equipment at the subscriber location to eliminate or reduce damage loss to the user. Specific examples would be to electrically tie a thermometer into the subscriber circuit to automatically open it when the temperature moved out of a predetermined safe zone. This could be utilized for all temperature ranges, that is, low, high, or medium degree ranges. Another specific example would be to electrically tie in an olfactometer to detect various odors. When the predetermined odor was detected by the olfactometer the subscriber circuit would automatically be opened. This application would have beneficial application in the flavoring and related industries where immediate notice of a breakdown could save many dollars and valuable time. These meters could also be connected to warning alarm sounding devices at the subscriber location in place of opening the subscriber circuit. In these applications the meter would activate the alarm to produce a specific sound that would pass through the system and be delivered through the loudspeaker 182. The operator at the central monitor unit 30 can then determine the subscriber location giving the alarm as described above and by the sound being produced determine the nature of the trouble. These specific applications have not been illustrated in the drawings, but the method of electrically connecting such equipment is well known in the art.

While but one basic form of the invention and various modifications has been shown and described, other forms within the spirit and scope of the invention will be apparent to those skilled in the art. Therefore, the embodiments shown in the drawings and discussed in this disclosure are to be considered as merely being set forth for illustrative purposes and are not intended to limit the scope of the invention as herein described and shown.

Other modes of applying the principle of my invention may be employed instead of those explained, change being made as regards the details herein described, provided the means stated by any of the following claims or the equivalent of such stated means be employed.

I therefore particularly point out and distinctly claim as my invention:

1. A warning system having plural subscriber circuits comprising, in combination,
   (a) at least two microphones,
   (b) said microphones positioned at separate locations,
   (c) a central monitor unit,
   (d) a channel service,
   (e) said channel service connecting each of said microphones individually with said central monitor unit,
   (f) said central monitor unit having a separate subscriber circuit connected to each of said microphones through said channel service, (g) a central amplifier at said monitor unit, (h) at least one impedance matching transformer as part of said central monitor unit and normally electrically connected between a plurality of said subscriber circuits and said central amplifier simultaneously, thereby simultaneously passing electrical signals from the subscriber circuits to said amplifier, (i) said impedance matching transformer having a common high impedance winding, a maintaining resistor, and a disconnect switch, said disconnect switch having a first position connecting said common high impedance winding with said central amplifier while holding said maintaining resistor open and having a second position connecting said maintaining resistor to said central amplifier while disconnecting said winding therefrom, (j) a loudspeaker at said monitor unit coupled to said central amplifier to receive the signals amplified thereby, such that actual sounds at all of said separate locations may normally be heard simultaneously, (k) a switch means for disconnecting selected ones of said microphones from said loudspeaker, to enable a listener to isolate a sound from a particular location.

2. A warning system as defined in claim 1 having,
(a) an indicator means operating with each separate subscriber circuit to indicate an open circuit.

3. A warning system as defined in claim 2 having,
(a) an indicator means operating with each separate subscriber circuit to indicate a closed circuit.

4. A warning system as defined in claim 1 having,
(a) current control means to adjust the current in each separate subscriber circuit, and
(b) an ammeter and means for connecting same into each of said separate subscriber circuits.

5. A warning system as defined in claim 1 having,
(a) a test loudspeaker positioned substantially near at least one of said microphones on said subscriber circuits, and (b) an actuator means located at said central monitor unit's location and connected to said test loudspeaker.

6. A warning system as defined in claim 5 having,
(a) current control means to adjust the current in each separate subscriber circuit, and
(b) an ammeter and means for connecting same into each of said separate subscriber circuits.

7. An audio warning system as defined in claim 1, having
(a) an indicator means electrically connected at at least one of said microphone locations to open the subscriber circuit connected thereto upon activation.

8. An audio warning system as defined in claim 1, having
(a) an indicator means positioned at at least one of said microphone locations,
(b) a sound alarm means positioned at such microphone location, and
(c) said indicator means connected to said sound alarm means to turn it on when activated.

References Cited

UNITED STATES PATENTS

| | | | |
|---|---|---|---|
| 640,273 | 1/1900 | Coleman | 340—276 |
| 1,412,103 | 4/1922 | Crisson | 179—175.2 |
| 1,643,759 | 9/1927 | Adams | 340—261 |
| 2,212,660 | 8/1940 | Durbin | 179—1 |
| 2,616,973 | 11/1952 | Mantz | 179—1 X |
| 2,709,251 | 5/1955 | Schmidt | 340—261 |
| 2,796,600 | 6/1957 | Church | 340—261 |
| 3,167,755 | 1/1965 | Larrick et al. | 340—261 |

JOHN W. CALDWELL, Primary Examiner

D. L. TRAFTON, Assistant Examiner

U.S. Cl. X.R.

179—1; 340—276

PO-1050
(5/69)

UNITED STATES PATENT OFFICE
CERTIFICATE OF CORRECTION

Patent No. 3,513,465                Dated May 19, 1970

Inventor(s) Henry W. Titherington

It is certified that error appears in the above-identified patent and that said Letters Patent are hereby corrected as shown below:

Column 4, line 65, for "the other" read --one--.
Column 7, line 54, after "operator can" insert --then--.

OCT 27 1970

(SEAL)
Attest:

Edward M. Fletcher, Jr.
Attesting Officer

WILLIAM E. SCHUYLER, JR.
Commissioner of Patents